United States Patent
Tsuchiya et al.

(10) Patent No.: US 10,035,222 B2
(45) Date of Patent: Jul. 31, 2018

(54) SOLDERING FLUX AND SOLDER PASTE COMPOSITION

(71) Applicant: TAMURA CORPORATION, Tokyo (JP)

(72) Inventors: Masahiro Tsuchiya, Iruma (JP); Akira Kitamura, Iruma (JP); Momoko Seino, Iruma (JP); Masaya Arai, Iruma (JP)

(73) Assignee: TAMURA CORPORATION, Tokyo (JP)

( * ) Notice: Subject to any disclaimer, the term of this patent is extended or adjusted under 35 U.S.C. 154(b) by 842 days.

(21) Appl. No.: 14/495,900

(22) Filed: Sep. 25, 2014

(65) Prior Publication Data

US 2015/0090366 A1 Apr. 2, 2015

(30) Foreign Application Priority Data

Sep. 30, 2013 (JP) .................. 2013-203068

(51) Int. Cl.
*B23K 35/362* (2006.01)
*B23K 35/36* (2006.01)

(52) U.S. Cl.
CPC ........ *B23K 35/3613* (2013.01); *B23K 35/362* (2013.01)

(58) Field of Classification Search
CPC ................ B23K 35/3613; B23K 35/362
See application file for complete search history.

(56) References Cited

U.S. PATENT DOCUMENTS

| | | | | |
|---|---|---|---|---|
| 5,571,340 A | * | 11/1996 | Schneider | B23K 35/3615 148/23 |
| 2003/0051770 A1 | * | 3/2003 | Nishina | B23K 35/3618 148/23 |
| 2008/0053572 A1 | * | 3/2008 | Sanji | B23K 35/0244 148/23 |
| 2012/0291921 A1 | * | 11/2012 | Iwamura | B23K 35/3613 148/23 |

FOREIGN PATENT DOCUMENTS

| | | |
|---|---|---|
| JP | 2002-239785 | 8/2002 |
| JP | 2008-062252 | 3/2008 |
| JP | 2008-302407 | 12/2008 |
| JP | 2011-121059 | 6/2011 |
| JP | 2012-004347 | 1/2012 |
| JP | 5181136 B2 | 4/2013 |
| JP | 6215633 B2 | 4/2015 |

OTHER PUBLICATIONS

Japanese Office Action for corresponding JP Application No. 2013-203068, dated Jul. 18, 2017 (w/ English machine translation).
Decision to Grant a Patent for corresponding JP Application No. 2013-203068, Dec. 5, 2017 (w/ English machine translation).

* cited by examiner

*Primary Examiner* — Colleen P Dunn
*Assistant Examiner* — Rajinder S Bajwa
(74) *Attorney, Agent, or Firm* — Mori & Ward, LLP

(57) ABSTRACT

A soldering flux includes a base resin, an activator, and a solvent. The activator contains an acrylic resin having an acid value of not more than 50 mg KOH/g and represented by a general formula (1).

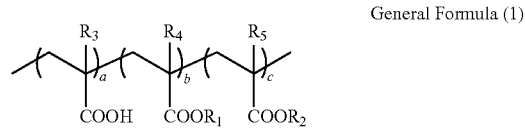

General Formula (1)

A monomer weight ratio of a, b, and c is $b/(a+b+c) \geq 0.6$, at least one of a and c may be 0, $R_1$ is an alkyl group having a carbon number of 8 to 24, $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups. The solvent contains a compound having a carboxyl group in a cyclohexyl skeleton and represented by a general formula (2).

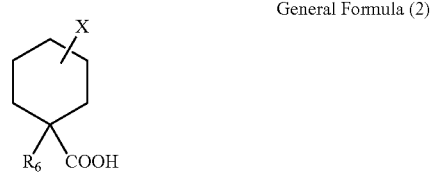

General Formula (2)

12 Claims, No Drawings

SOLDERING FLUX AND SOLDER PASTE COMPOSITION

CROSS-REFERENCE TO RELATED APPLICATIONS

The present application claims priority under 35 U.S.C. § 119 to Japanese Patent Application No. 2013-203068, filed Sep. 30, 2013. The contents of this application are incorporated herein by reference in their entirety.

BACKGROUND OF THE INVENTION

1. Field of the Invention

The present invention relates to a soldering flux and a solder paste composition.

2. Description of the Related Art

In general, a solder paste composition used when electronic components are mounted on a substrate is produced by mixing a soldering flux with a solder alloy powder. When soldering is performed using the solder paste composition, a portion of the soldering flux tends to remain as flux residue near a solder joint on the substrate.

In general, the above soldering flux contains a base resin, an activator, and a solvent. As the base resin, rosin has been widely used.

Along with the recent improvement of the performance of electronic products and realization of high density of the electronic products, a substrate is often exposed under an environment where temperature difference is extreme. When flux residue formed from a soldering flux using rosin as a base resin is placed under such an environment, the flux residue becomes easily hard and brittle due to its nature. The flux residue is easily cracked with the elapse of time. Thus, since water easily permeates through a circuit portion through the crack, there occur such problems as short circuit of a circuit and corrosion of the metal of the circuit.

As a method of solving the above problem, there is a method of using an acrylic resin or the like as a base resin instead of a rosin-based resin or using the rosin-based resin and the acrylic resin together. For example, as disclosed in JP 2011-121059 A, there is a method of using as a base resin an acrylic resin, prepared by copolymerizing a monomer containing (meth)acrylic ester having a long-chain alkyl group, and rosins at a fixed compounding ratio.

Along with the recent miniaturization of component terminals, an opening of a metal mask used in a screen printing method, which is a method of supplying a common solder paste composition, tends to be reduced in diameter. In the screen printing method, the solder paste composition is filled in the opening of the metal mask by a squeegee. After the filling of the solder paste composition, the solder paste composition is transferred to the substrate side when the metal mask separates from the substrate. At this time, since the solder paste composition is adhered to the squeegee and a wall surface of the metal mask, there occurs such a phenomenon that the volume and shape of the solder paste composition transferred to the substrate side are not in accordance with the design of the metal mask.

In some cases, miniaturized components and large-sized components are mounted on a substrate while being mixed with each other. In this case, in order to maintain the amount of the solder paste composition to be supplied to electrodes of the large-sized components at a certain level or more, the thickness of the metal mask is often set to be not less than a constant thickness, and an aspect ratio of the opening of the metal mask corresponding to the miniaturized component terminals increases. Thus, under this state, abnormality in the transferred shape of the solder paste due to adhesion of the solder paste onto the wall surface of the metal mask tends to occur.

When the opening of the metal mask is reduced in diameter, a particle diameter of a solder alloy powder contained in the solder paste composition is required to be reduced. In this case, the surface area of particles of the solder alloy powder (hereinafter referred to as solder particles) increases with respect to the volume. Thus, active force of a flux enough to reduce an oxide film on a surface of the solder particles and melt the solder particles is required.

SUMMARY OF THE INVENTION

According to one aspect of the present invention, a soldering flux includes a base resin, an activator, and a solvent. The base resin contains an acrylic resin having an acid value of not more than 50 mg KOH/g and represented by a general formula (1).

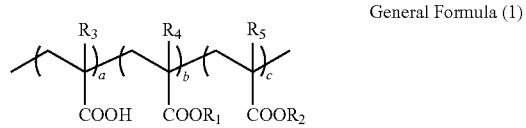

General Formula (1)

A monomer weight ratio of a, b, and c is $b/(a+b+c) \leq 0.6$, at least one of a and c may be 0, $R_1$ is an alkyl group having a carbon number of 8 to 24, $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups. The activator contains a compound having a carboxyl group in a cyclohexyl skeleton and represented by a general formula (2).

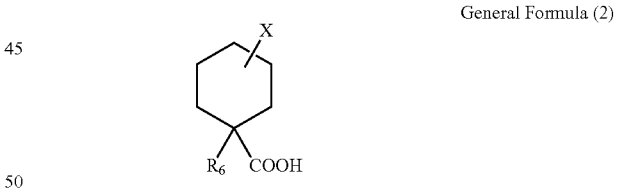

General Formula (2)

$R_6$ is a hydrogen atom or a methyl group, X is any one of a carboxyl group, an alkyl group, and a cyclic structure bonded with an alkylene group (a single or a plurality of rings may be formed, and partially unsaturated bond, a carboxyl group, a carboxylic anhydride group, a halogen group, an aromatic ring, and an amino group may be contained), X may be one of the above substituents or a combination of a plurality of substituents, and X may contain a halogen group or an amino group and an alkylated amino group as substituents.

According to another aspect of the present invention, a solder paste composition includes a solder alloy powder and a soldering flux. The soldering flux includes a base resin, an activator, and a solvent. The base resin contains an acrylic resin having an acid value of not more than 50 mg KOH/g and represented by a general formula (1).

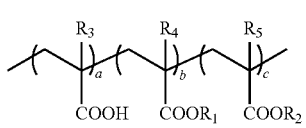

General Formula (1)

A monomer weight ratio of a, b, and c is b/(a+b+c)≤0.6, at least one of a and c may be 0, $R_1$ is an alkyl group having a carbon number of 8 to 24, $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups. The activator contains a compound having a carboxyl group in a cyclohexyl skeleton and represented by a general formula (2).

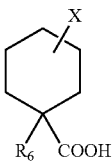

General Formula (2)

$R_6$ is a hydrogen atom or a methyl group, X is any one of a carboxyl group, an alkyl group, and a cyclic structure bonded with an alkylene group (a single or a plurality of rings may be formed, and partially unsaturated bond, a carboxyl group, a carboxylic anhydride group, a halogen group, an aromatic ring, and an amino group may be contained), X may be one of the above substituents or a combination of a plurality of substituents, and X may contain a halogen group or an amino group and an alkylated amino group as substituents.

DESCRIPTION OF THE EMBODIMENTS

A detailed description will hereinafter be given of an embodiment of the soldering flux and the solder paste composition of the present disclosure. Incidentally, this will not limit the invention.

Embodiment

1. Soldering Flux (1) Base Resin

<Acrylic Resin Having an Acid Value of not More than 50 mg KOH/g>

An example of an acrylic resin having an acid value of not more than 50 mg KOH/g in the present embodiment includes an acrylic resin represented by the following general formula (1). As such an acrylic resin, there is preferably used an acrylic resin obtained by polymerizing or copolymerizing, for example, (a) (meth)acrylic acid, (b) a (meth)acrylic monomer having an alkyl group having a carbon number of 8 to 24, and (c) a (meth)acrylic monomer other than the (meth)acrylic monomer concerned so that the compounding ratio of them is (b)/((a)+(b)+(c))≥0.6 (at least one of (a) and (c) may be 0).

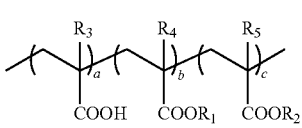

General Formula (1)

(where the monomer weight ratio of a, b, and c is b/(a+b+c)≥0.6, at least one of a and c may be 0, the $R_1$ is an alkyl group having a carbon number of 8 to 24, the $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups).

Examples of (a), (b), and (c) include a monomer having a carboxyl group such as (meth)acrylic acid, itaconic acid, maleic acid, and crotonic acid and a monomer such as octyl(meth)acrylate, nonyl(meth)acrylate, decyl(meth)acrylate, undecyl(meth)acrylate, dodecyl(meth)acrylate, tridecyl(meth)acrylate, tetradecyl(meth)acrylate, lauryl(meth)acrylate, stearyl(meth)acrylate, iso forms of them, methyl(meth)acrylate, ethyl(meth)acrylate, butyl(meth)acrylate, hexyl(meth)acrylate, and propyl(meth)acrylate, and one or a plurality of these monomers can be polymerized or copolymerized.

The acid value of the acrylic resin can be adjusted by the compounding ratio of the monomer in use, the compounding amount, and the conditions during polymerization or copolymerization. The acid value is not more than 50 mg KOH/g, preferably 30 mg KOH, and more preferably 5 mg KOH/g.

In this specification, (meth)acrylic acid is a collective term of acrylic acid and methacrylic acid.

A weight average molecular weight of the acrylic resin is preferably not more than 50,000 and more preferably not more than 30,000. The glass transition temperature (Tg) is preferably not more than −40° C.

The compounding amount of the acrylic resin is preferably from 5% by weight to 50% by weight based on the total amount of the soldering flux.

<Resins Other than Acrylic Resin Having Acid Value of not More than 50 mg KOH/g>

In the base resin of the present embodiment, an acrylic resin having an acid value of not more than 50 mg KOH/g and represented by the general formula (1) may be used singly or together with a resin other than the acrylic resin.

Examples of the other resin include a rosin-based resin, an acrylic resin, a styrene-maleic acid resin, an epoxy resin, an urethane resin, a polyester resin, a phenoxy resin, and a terpene resin.

Among the above resins, as the rosin-based resin, rosin such as tall oil rosin, gum rosin, and wood rosin and a rosin derivative such as hydrogenated rosin, polymerized rosin, disproportionated rosin, acrylic acid modified rosin, and maleic acid modified rosin may be compounded.

The above other resins may be used singly or in combination with each other. The other resins usable in the soldering flux of the present embodiment are not limited to the above resins.

In the acrylic resin having an acid value of not more than 50 mg KOH/g and represented by the following general formula (1), in the case of using the base resin and other resin together, when the compounding ratio of the acrylic resin having an acid value of not more than 50 mg KOH/g and represented by the following general formula (1) is 1, the compounding ratio of other resin is preferably not more than 0.5. The more preferable compounding ratio of other resin is not more than 0.3.

(2) Activator

<Compound Having Carboxyl Group in Cyclohexyl Skeleton>

The activator used in the soldering flux of the present embodiment contains a compound having a carboxyl group in a cyclohexyl skeleton and represented by the following general formula (2):

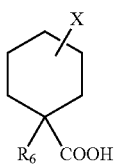

General Formula (2)

(where, $R_6$ is a hydrogen atom or a methyl group, X is any one of a carboxyl group, an alkyl group, and a cyclic structure bonded with an alkylene group (a single or a plurality of rings may be formed, and partially unsaturated bond, a carboxyl group, a carboxylic anhydride group, a halogen group, an aromatic ring, and an amino group may be contained), X may be one of the above substituents or a combination of a plurality of substituents, and X may contain a halogen group or an amino group or an alkylated amino group as substituents).

Since the soldering flux of the embodiment of the present invention contains the acrylic resin having an acid value of not more than 50 mg KOH/g and represented by the following general formula (1) and the compound having a carboxyl group in a cyclohexyl skeleton and represented by the following formula (2), cracking resistance of flux residue, a printing property of a solder paste, good solderability in reflow (reflow characteristics), and reliability can be realized simultaneously.

Any compound having a carboxyl group in a cyclohexyl skeleton may be used as long as the compound is represented by the general formula (2). Example of the above compound includes a compound obtained by modifying abietic acid and its isomers, and the compound includes general rosin-based compounds. As the rosin-based compound, highly oxidized acrylic acid modified rosin (including its hydrogenated product) is particularly preferably used. Preferable examples of the above compound include cyclohexane carboxylic acid, 1,4-cyclohexane dicarboxylic acid, 1,3-cyclohexane dicarboxylic acid, 4-aminocyclohexanecarboxylic acid, hydrogenated trimellitic acid, and hydrogenated pyromellitic acid. Among them, 1,4-cyclohexane dicarboxylic acid is preferably used.

Those compounds may be used singly or in combination with each other.

The compounding amount of the compound having a carboxyl group in a cyclohexyl skeleton and represented by the general formula (2) is preferably from 0.5% by weight to 10% by weight based on the total amount of the soldering flux.

<Other Activators>

In the soldering flux of the present embodiment, the compound having a carboxyl group in a cyclohexyl skeleton and represented by the general formula (2) may be used singly as the activator, or the compound concerned and other activators other than the compound can be used together.

Examples of the other activator include amine salts (inorganic acid salts and organic acid salts) such as halogenated hydrogen salts of organic amine, organic acid, organic acid salts, and organic amine salts. More specific examples of the activator include diphenyl guanidine hydrobromate, cyclohexyl amine hydrobromate, diethyl amine hydrochloride, succinic acid, adipic acid, and sebacic acid. Those activators may be used singly or in combination with each other. Other activators usable in the soldering flux of the present embodiment are not limited to the above activators.

When another activator is used together with the above activator, as the compounding amount, the total amount of another activator and the compound having a carboxyl group in a cyclohexyl skeleton and represented by the general formula (2) is preferably from 5% by weight to 50% by weight based on the total amount of the soldering flux.

(3) Solvent

Examples of the solvent used in the soldering flux of the present embodiment include isopropyl alcohol, ethanol, acetone, toluene, xylene, ethyl acetate, ethyl cellosolve, butyl cellosolve, and glycol ether. Those solvents may be used singly or in combination with each other.

The compounding amount of the above solvent is preferably from 20% by weight to 50% by weight based on the total amount of the soldering flux. The activators usable in the soldering flux of the present embodiment are not limited to the above activators.

(4) Antioxidant

In order to suppress oxidization of a solder alloy powder, an antioxidant can be compounded with the soldering flux of the present embodiment. Examples of the antioxidant include hindered phenolic antioxidant, phenolic antioxidant, bisphenolic antioxidant, and polymeric antioxidant. Among them, hindered phenolic antioxidant is particularly preferably used. Those antioxidants may be used singly or in combination with each other. The antioxidants usable in the soldering flux of the embodiment of the present invention are not limited to the above antioxidants.

The compounding amount of such an antioxidant is not limited particularly. The general compounding amount is approximately from 0.5% by weight to 5% by weight based on the total amount of the soldering flux.

(5) Thixotropic Agent

In order to adjust the viscosity of the solder paste composition to a level suitable for printing, a thixotropic agent can be compounded with the soldering flux of the present embodiment. Examples of the thixotropic agent include hydrogenated castor oil, fatty acid amides, and oxyfatty acids. The thixotropic agents usable in the soldering flux of the present embodiment are not limited to the above thixotropic agents.

The compounding amount of the thixotropic agent is preferably from 3% by weight to 15% by weight based on the total amount of the soldering flux.

(6) Additive

The soldering flux of the present embodiment may further contain an additive such as halogen, a flatting agent, and an antifoaming agent. The compounding amount of the additive is preferably not more than 10% by weight based on the total amount of the soldering flux and more preferably not more than 5% by weight.

2. Solder Alloy Powder

An example of the solder alloy powder used in the solder paste composition of the present embodiment includes a combination of Sn, Ag, Cu, Bi, Zn, In, Ga, Sb, Au, Pd, Ge, Ni, Cr, Al, P, In, Pb, and so on. As a typical solder alloy powder, although a lead-free solder alloy powder such as Sn—Ag—Cu and Sn—Ag—Cu—In is used, a solder alloy powder containing lead may be used.

The compounding amount of the solder alloy powder is preferably not less than 65% by weight and not more than 95% by weight based on the total amount of the solder paste composition. The compounding amount of the solder alloy powder is more preferably not less than 85% by weight and not more than 93% by weight and particularly preferably not less than 89% by weight and not more than 92% by weight.

In the solder paste composition in which the compounding amount of the solder alloy powder is less than 65% by weight, sufficient solder joint tends to become hard to be formed. Meanwhile, in the solder paste composition in which the compounding amount of the solder alloy powder is more than 95% by weight, since the soldering flux as a binder is insufficient, the soldering flux and the solder alloy powder tend to become hard to be mixed with each other.

The solder paste composition of the present embodiment is produced by mixing the soldering flux with the solder alloy powder via a commonly known method.

Examples

Hereinafter, the embodiment of the present invention will be described in detail using examples and comparative examples. The invention is not limited to those examples.

Production of Acrylic Resins A to F

Compounds represented by the following general formulae (3) to (6) were provided.

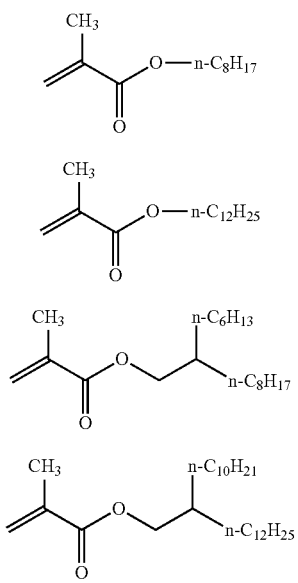

General Formula (3)

General Formula (4)

General Formula (5)

General Formula (6)

<Acrylic Resin A>

A solution 1 prepared by mixing 40% by weight of the compound represented by the general formula (4) with 60% by weight of the compound represented by the general formula (6) was produced.

200 g of diethylhexyl glycol was prepared in a four-necked flask of 500 ml equipped with a stirring machine, a reflux pipe, and a nitrogen introducing pipe and heated to 110° C. After that, 0.2% by weight to 5% by weight of an azo-based radical initiator (dimethyl 2,2'-azobis(2-methyl propionate), commodity name: V-601, produced by Wako Pure Chemical Industries, Ltd.) was added to the solution 1 (300 g in total) and then dissolved. This resultant solution was dropped for 1.5 hours and thereafter stirred at 110° C. for 1 hour, and after that, the reaction was terminated to obtain an acrylic resin A. The weight average molecular weight of the acrylic resin A was 15,000, and the acid value was 0 mg KOH/g.

<Acrylic Resin B>

An acrylic resin B was obtained under a condition similar to that of the acrylic resin A except for using a solution 2 (300 g in total) containing 4.6% by weight of methacrylic acid, 35.4% by weight of the compound represented by the general formula (4), and 60% by weight of the compound represented by the general formula (5) mixed with each other. The weight average molecular weight of the acrylic resin B was 12,000, and the acid value was 30 mg KOH/g.

<Acrylic Resin C>

An acrylic resin C was obtained under a condition similar to that of the acrylic resin A except for using a solution 3 (300 g in total) containing the compound represented by the general formula (3). The weight average molecular weight of the acrylic resin C was 25,000, and the acid value was 0 mg KOH/g.

<Acrylic Resin D>

An acrylic resin D was obtained under a condition similar to that of the acrylic resin A except for using a solution 4 (300 g in total) containing 10.7% by weight of methacrylic acid mixed with 89.3% by weight of the compound represented by the general formula (4). The weight average molecular weight of the acrylic resin D was 12,000, and the acid value was 70 mg KOH/g.

<Acrylic Resin E>

An acrylic resin E was obtained under a condition similar to that of the acrylic resin A except for using a solution 5 (300 g in total) containing 40% by weight of the compound represented by the general formula (4) mixed with 60% by weight of the compound represented by the general formula (5). The weight average molecular weight of the acrylic resin E was 40,000, and the acid value was 0 mg KOH/g.

<Acrylic Resin F>

An acrylic resin F was obtained under a condition similar to that of the acrylic resin A except for using a solution 6 (300 g in total) containing 0.75% by weight of methacrylic acid, 39.25% by weight of the compound represented by the general formula (4), and 60% by weight of the compound represented by the general formula (5) mixed with each other. The weight average molecular weight of the acrylic resin F was 12,000, and the acid value was 5 mg KOH/g.

Production of Solder Paste Composition

Respective components were kneaded with the composition and compounding shown in Table 1, and soldering fluxes according to Examples 1 to 6 and Comparative Examples 1 to 4 were produced. In Table 1, the units of the numerical values representing the composition are % by weight unless otherwise designated.

Subsequently, 12% by weight of each of the above soldering fluxes and 88% by weight of a Sn-3Ag-0.5Cu solder alloy powder were mixed with each other, and solder paste compositions according to Examples 1 to 6 and Comparative Examples 1 to 4 were obtained.

TABLE 1

| | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Acrylic resin | Acrylic resin A | 36 | 36 | | | | | 36 | 36 | | |
| | Acrylic resin B | | | 36 | | | | | | | |
| | Acrylic resin C | | | | 36 | | | | | | |
| | Acrylic resin D | | | | | | | | | 36 | |
| | Acrylic resin E | | | | | 36 | | | | | |
| | Acrylic resin F | | | | | | 36 | | | | |
| Compound having carboxyl group in cyclohexane skeleton | KE-604 *1 | 15 | 10 | 12 | 10 | 10 | 10 | | | 10 | 46 |
| | 1,4-cyclohexane dicarboxylic acid | | 3 | 1 | 3 | 3 | 3 | | | | |
| Activator | Adipic acid | 5 | 5 | 5 | 5 | 5 | 5 | 10 | | 5 | 5 |
| | Succinic acid SL-20 *2 | | | | | | | | 10 | | |
| Thixotropic agent | SLIPAX ZHH *3 | 7 | 7 | 7 | 7 | 7 | 7 | 7 | 7 | 7 | 7 |
| Solvent | 2-ethylhexyl diglycol | 36 | 38 | 38 | 38 | 38 | 38 | 36 | 38 | 41 | 41 |
| Antioxidant | IRGANOX 245 *4 | 1 | 1 | 1 | 1 | 1 | 1 | 1 | 1 | 1 | 1 |

*1 acrylic acid modified rosin produced by Arakawa Chemical Industries, Ltd.
*2 eicosanedioic acid produced by Okamura Oil Mill Co., Ltd.
*3 fatty acid amide produced by Nippon Kasei Chemical Co., Ltd.
*4 hindered phenolic antioxidant produced by BASF Japan Ltd.

The solder paste compositions of Examples 1 to 6 and Comparative Examples 1 to 4 were measured and evaluated as follows. The results are shown in Table 2.

<Residue Cracking Resistance>

Each solder paste composition was printed on a substrate having a 0.8 mm pitch QFP (Quad Flat Package) pattern with the use of a metal mask having the same pattern and having a thickness of 150 μm. Within 10 minutes after printing, each substrate after printing was subjected to reflow at a maximum temperature of 240° C. under an oxygen concentration of 4,000 ppm by using a reflow furnace (commodity name: TNP40-577PH, manufactured by TAMURA Corporation). After each substrate after reflow was stood at 150° C. for 200 hours, 50 cycles of cold-heat cycle load in which one cycle was −40° C.×30 minutes→125° C.×30 minutes were applied to the respective substrates, and then a crack occurrence state in a soldering portion of the QFP pattern of each of the substrates was confirmed visually and evaluated based on the following standard:

○: the number of cracks connecting terminals (96 points in all) of QFP connecting portion is less than 10
X: the number of cracks connecting terminals (96 points in all) of QFP connecting portion is not less than 10

<Printing Property Test>

A glass epoxy substrate having an electrode (1.3 mm×0.25 mm) on which a 208-pin 0.5 mm pitch QFP (PKG size: 28 mm×28 mm×3.2 mm) could be mounted was provided. In each solder paste composition, six solder paste compositions were continuously printed on the glass epoxy substrate with the use of a metal mask having the same pattern as the electrode and having a thickness of 150 μm. Each of the printed substrates was evaluated as follows by using an image inspection machine (commodity name: aspire 2, manufactured by Koh Young Technology Inc.).

○: difference height is not more than 170 μm
Δ: difference height is more than 170 μm and not more than 250 μm
X: difference height is more than 250 μm <Solderability Test (Chip Side Ball)>

A glass epoxy substrate having an electrode (1.2 mm×0.8 mm) on which a chip component having a size of 2.0 mm×1.2 mm could be mounted was provided. Each solder paste composition was printed on the substrate with the use of a metal mask having the same pattern as the electrode and having a thickness of 150 μm, and the chip component was mounted on the substrate. Each substrate on which the chip component was mounted was placed under a nitrogen atmosphere having an oxygen concentration of 1500±500 ppm and thereafter heated and soldered by using a reflow furnace (commodity name: TNP-538EM manufactured by TAMURA Corporation) whose peak temperature was set to 260° C. In each soldered substrate, the number of solder balls formed around and under the components was counted by using an X ray transmission device (commodity name: SMX-160E, manufactured by Shimadzu Corporation), and each soldered substrate was evaluated as follows.

○: the number of solder balls formed per ten chips is not more than five
X: the number of solder balls formed per ten chips is more than five

TABLE 2

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Residue cracking resistance | ○ | ○ | ○ | ○ | ○ | ○ | ○ | ○ | ○ | X |
| Printing property | ○ | ○ | Δ | ○ | Δ | ○ | ○ | ○ | X | X |
| Reflow characteristics | Δ | ○ | ○ | ○ | ○ | ○ | X | X | ○ | ○ |

Hereinabove, as shown in Examples, although the solder paste composition using the soldering flux of each Example uses the acrylic resin having an acid value of not more than 50 mg KOH/g, a good printing property and good solderability in reflow (reflow characteristics) are realized simultaneously, and it is found that the cracking resistance of the flux residue is excellent. Such a solder paste composition can be suitably used in a substrate used under an environment particularly requiring high reliability.

The embodiment of the present invention provides a soldering flux which can suppress occurrence and development of cracks to flux residue under an extreme cold heat cycle environment over a long period of time and can simultaneously realize a good printing property and good solderability.

The embodiment of the present invention further provides a solder paste composition using a soldering flux which can suppress occurrence and development of cracks to flux residue under an extreme cold heat cycle environment over a long period of time and can simultaneously realize a good printing property and good solderability.

In order to obtain the above benefits, the embodiment of the present invention is characterized by being configured as follows.

(1) A soldering flux of the embodiment of the invention contains a base resin, an activator, and a solvent, further contains as the base resin an acrylic resin having an acid value of not more than 50 mg KOH/g and represented by the following general formula (1), and furthermore contains as the activator a compound having a carboxyl group in a cyclohexyl skeleton and represented by the following general formula (2).

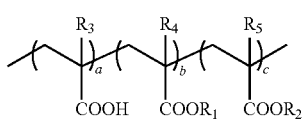

General Formula (1)

(where the monomer weight ratio of a, b, and c is $b/(a+b+c) \geq 0.6$, at least one of a and c may be 0, the $R_1$ is an alkyl group having a carbon number of 8 to 24, the $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups).

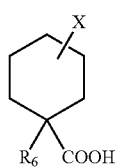

General Formula (2)

(where the $R_6$ is a hydrogen atom or a methyl group, X is any one of a carboxyl group, an alkyl group, and a cyclic structure bonded with an alkylene group (a single or a plurality of rings may be formed, and partially unsaturated bond, a carboxyl group, a carboxylic anhydride group, a halogen group, an aromatic ring, and an amino group may be contained), X may be one of the above substituents or a combination of a plurality of substituents, and X may contain a halogen group or an amino group or an alkylated amino group as substituents).

(2) In the above configuration (1), it is characterized in that a weight average molecular weight of an acrylic resin having an acid value of not more than 50 mg KOH/g and represented by the general formula (1) is not more than 50,000.

(3) In the above configuration (1) or (2), it is characterized in that a compounding amount of the acrylic resin having an acid value of not more than 50 mg KOH/g and represented by the general formula (1) is from 5% by weight to 50% by weight based on the total amount of the soldering flux, and a compounding amount of the activator is from 5% by weight to 50% by weight based on the total amount of the soldering flux.

(4) In the above configurations (1) to (3), it is characterized in that a compound having a carboxyl group in a cyclohexyl skeleton and represented by the following general formula (2) is at least one of a rosin compound (abietic acid, abietic acid isomer, abietic acid, or a derivative of abietic acid isomer) and cyclohexanedicarboxylic acid.

(5) A solder paste composition of the embodiment of the present invention is characterized by containing the soldering flux of the above (1) to (4) and a solder alloy powder.

The soldering flux and the solder paste composition of the embodiment of the present invention can suppress occurrence and development of cracks to flux residue under an extreme cold heat cycle environment over a long period of time and can simultaneously realize a good printing property and good solderability.

Obviously, numerous modifications and variations of the present invention are possible in light of the above teachings. It is therefore to be understood that within the scope of the appended claims, the invention may be practiced otherwise than as specifically described herein.

What is claimed is:
1. A soldering flux comprising:
a base resin containing an acrylic resin and an other resin other than the acrylic resin, the acrylic resin having an acid value of not more than 30 mg KOH/g and represented by a general formula (1)

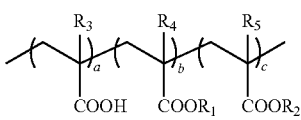

General Formula (1)

wherein a monomer weight ratio of a, b, and c is $b/(a+b+c) \leq 0.6$, at least one of a and c may be 0, $R_1$ is an alkyl group having a carbon number of 8 to 24, $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups;

an activator containing a compound having a carboxyl group in a cyclohexyl skeleton and represented by a general formula (2)

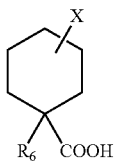

General Formula (2)

wherein, $R_6$ is a hydrogen atom or a methyl group, X is any one of a carboxyl group, an alkyl group, and a cyclic structure bonded with an alkylene group (a single or a plurality of rings may be formed, and partially unsaturated bond, a carboxyl group, a carboxylic anhydride group, a halogen group, an aromatic ring, and an amino group may be contained), X may be one of the above substituents or a combination of a plurality of substituents, and X may contain a halogen group or an amino group and an alkylated amino group as substituents; and a solvent, wherein, when a compounding ratio of the acrylic resin having an acid value of not more than 30 mg KOH/g and represented by the general formula (1) is 1, a compounding ratio of the other resin is not more than 0.3.

2. The soldering flux according to claim 1, wherein a weight average molecular weight of the acrylic resin having an acid value of not more than 30 mg KOH/g and represented by the general formula (1) is from 12,000 to 40,000.

3. The soldering flux according to claim 2, wherein a compounding amount of the acrylic resin having an acid value of not more than 30 mg KOH/g and represented by the general formula (1) is from 5% by weight to 50% by weight based on a total amount of the soldering flux, and a compounding amount of the activator is from 5% by weight to 50% by weight based on the total amount of the soldering flux.

4. The soldering flux according to claim 2, wherein the compound having a carboxyl group in a cyclohexyl skeleton and represented by the general formula (2) is at least one of a rosin compound (abietic acid, abietic acid isomer, abietic acid, or a derivative of abietic acid isomer) and cyclohexanedicarboxylic acid.

5. A solder paste composition comprising:
a solder alloy powder; and
a soldering flux comprising:
    a base resin containing an acrylic resin and an other resin other than the acrylic resin, the acrylic resin having an acid value of not more than 30 mg KOH/g and represented by a general formula (1)

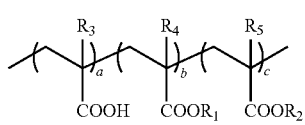

General Formula (1)

wherein a monomer weight ratio of a, b, and c is $b/(a+b+c) \leq 0.6$, at least one of a and c may be 0, $R_1$ is an alkyl group having a carbon number of 8 to 24, $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups;

an activator containing a compound having a carboxyl group in a cyclohexyl skeleton and represented by a general formula (2)

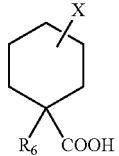

General Formula (2)

wherein, $R_6$ is a hydrogen atom or a methyl group, X is any one of a carboxyl group, an alkyl group, and a cyclic structure bonded with an alkylene group (a single or a plurality of rings may be formed, and partially unsaturated bond, a carboxyl group, a carboxylic anhydride group, a halogen group, an aromatic ring, and an amino group may be contained), X may be one of the above substituents or a combination of a plurality of substituents, and X may contain a halogen group or an amino group and an alkylated amino group as substituents; and a solvent, wherein, when a compounding ratio of the acrylic resin having an acid value of not more than 30 mg KOH/g and represented by the general formula (1) is 1, a compounding ratio of the other resin is not more than 0.3.

6. The soldering flux according to claim 2, wherein the monomer weight ratio of a, b, and c is $b/(a+b+c) \leq 0.6$, c is 0, $R_1$ is an alkyl group having a carbon number of 8 to 24, $R_2$ is a substituent other than the $R_1$ and may be one of substituents including a hydrogen atom, a methyl group, an alkyl group, an aryl group, and a hydroxyl group or a combination of a plurality of substituents, and $R_3$, $R_4$, and $R_5$ are hydrogen atoms or methyl groups of the activator containing an acrylic resin having an acid value of not more than 30 mg KOH/g and represented by the general formula (1).

7. The soldering flux according to claim 1, wherein a compounding amount of the acrylic resin having an acid value of not more than 30 mg KOH/g and represented by the general formula (1) is from 5% by weight to 50% by weight based on a total amount of the soldering flux, and a compounding amount of the activator is from 5% by weight and 50% by weight based on the total amount of the soldering flux.

8. The soldering flux according to claim 2, wherein the compound having a carboxyl group in a cyclohexyl skeleton and represented by the general formula (2) is at least one of a cyclohexane carboxylic acid, 1,4-cyclohexane dicarboxylic acid, 1,3-cyclohexane dicarboxylic acid, 4-aminocyclohexanecarboxylic acid, hydrogenated trimellitic acid, and hydrogenated pyromellitic acid.

9. The soldering flux according to claim 2, wherein the compound having a carboxyl group in a cyclohexyl skeleton and represented by the general formula (2) is 1,4-cyclohexane dicarboxylic acid.

10. The soldering flux according to claim 1, wherein a weight average molecular weight of the acrylic resin having an acid value of not more than 30 mg KOH/g and represented by the general formula (1) is from 15,000 to 40,000.

11. The solder paste composition according to claim 5, wherein a weight average molecular weight of the acrylic resin having an acid value of not more than 30 mg KOH/g and represented by the general formula (1) is from 15,000 to 40,000.

12. The solder paste composition according to claim 5, wherein a compounding amount of the solder alloy powder is preferably not less than 65% by weight and not more than 95% by weight based on a total amount of the solder paste composition.

\* \* \* \* \*